United States Patent Office 3,531,481
Patented Sept. 29, 1970

3,531,481
METHOD FOR MANUFACTURE OF CRYSTALLINE CEPHALOSPORIN
Ralph R. Pfeiffer, Indianapolis, Ind., assignor to Eli Lilly and Company, Indianapolis, Ind., a corporation of Indiana
No Drawing. Filed Apr. 21, 1969, Ser. No. 818,125
Int. Cl. C07d 99/24
U.S. Cl. 260—243                                                8 Claims

ABSTRACT OF THE DISCLOSURE

Cephalexin monohydrate crystals, dense, large crystals, useful in formulations of the antibiotic, are prepared by precipitating cephalexin from an aqueous solution of its salt at a temperature above about 60° C.

BACKGROUND OF THE INVENTION

Cephalexin is a generic term used to identify a chemical compound, 7-(D-α-aminophenylacetamido)-3 - methyl - 3-cephem-4-carboxylic acid:

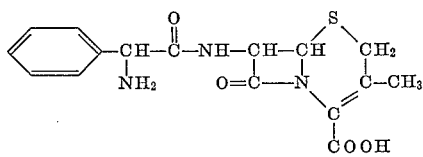

This antibiotic is active as a broad spectrum antibiotic effective in controlling diseases caused by a wide variety of Gram-positive and Gram-negative microorganisms. One of the unique features of this cephalosporin is that it has shown outstanding advantages for use as an oral antibiotic.

Cephalexin is one of the semi-synthetically produced cephalosporins. It can be made, for example, by acylating the cephalosporin nucleus, 7-aminocephalosporanic acid, commonly known as 7-ACA, in an aqueous medium with a mixed anhydride form of D-phenylglycine in which the free amino group has been protected by a suitable blocking group, to form the 7-(D-α-[blocked amino]-phenylacetamido)cephalosporanic acid, removing the blocking group by conventional methods to form 7-(D-α-aminophenylacetamido)cephalosporanic acid, and converting the latter compound to the corresponding 3-desacetoxy compound, cephalexin, by hydrogenolysis, as for example by the method of Stedman, U.S. Pat. 3,124,576. Alternative methods of effecting the acylation of 7-ACA and the hydrogenolysis of the acetoxy group are well known to those skilled in the art. It is also known that cephalexin can be prepared by a procedure in which the foregoing process steps are reversed, i.e. the cephalosporin nucleus can be hydrogenolyzed to the 3-desacetoxy-7-ACA and then acylated to form the desired cephalexin.

The source material for the 7-ACA employed in the foregoing synthesis is cephalosporin C, more precisely known as 7-(5′-aminoadipamido)cephalosporanic acid, which can be prepared by cultivating a cephalosporin C-producing organism in a suitable nutrient medium as described in British Pat. 810,196, and can then be readily converted into the corresponding nucleus compound, 7-aminocephalosporanic acid, by cleaving the 5′-amino-N′-adipamyl side chain between its amido carbonyl group and its amido nitrogen by known procedures.

An alternative preferred method of preparing cephalexin employs the ring-expansion process of Morin and Jackson, U.S. Pat. 3,275,626.

Recrystallization of cephalexin, without regard to the method whereby it is produced, from organic solvents such as acetonitrile, N,N-dimethylformamide, dimethyl-sulfoxide, methanol, ethanol, and the like, yields an anhydrous product. The anhydrous product is characteristically a small fiber-like crystal which is fluffy and bulky, and hygroscopic in nature. It easily picks up a static charge, and is relatively unstable because of its hygroscopic properties. These characteristics are particularly troublesome in preparing the compound for pharmaceutical uses. The charged particles repel one another and tend to be flyaway when being weighed and when being filled into capsules. The water absorbed because of the material's hygroscopicity, although tending to neutralize the static charge, causes the crystals to change weight and to make accurate weighing difficult.

It is an object of this invention to provide a method for obtaining a new crystalline form of cephalexin which overcomes the disadvantages inherent in the prior art forms.

SUMMARY OF THE INVENTION

In fulfillment of the aforementioned object, this invention provides a method for obtaining a novel crystalline cephalexin monohydrate.

The crystals of this new form of cephalexin are large and extremely dense, and are admirably adapted for formulation, particularly into solid dosage forms, such as filled capsules and the like.

In accordance with the present invention, crystalline cephalexin monohydrate is prepared by precipitation from an aqueous solution, maintained at above about 58° C. of an acid addition salt of cephalexin.

Detailed description

The novel crystalline form provided by the method of this invention has the following unique X-ray diffraction characteristics at λ=1.5405 using a Cu:Ni 45 kv. 20 ma. source.

| Spacing $d$ | Relative intensities $I/_{I_1}$ |
|---|---|
| 15.15 | .40 |
| 11.85 | 1.00 |
| 11.00 | .30 |
| 9.36 | .20 |
| 8.55 | .50 |
| 7.86 | .50 |
| 6.89 | .20 |
| 5.98 | .40 |
| 5.39 | 1.00 |
| 4.97 | .50 |
| 4.76 | .40 |
| 4.57 | .40 |
| 4.39 | .60 |
| 4.22 | .60 |
| 4.00 | .70 |
| 3.86 | .70 |
| 3.60 | .80 |
| 3.46 | .30 |
| 3.24 | .60 |
| 3.10 | .60 |
| 2.98 | .40 |
| 2.90 | .60 |
| 2.81 | .40 |
| 2.73 | .20 |
| 2.68 | .40 |
| 2.63 | .10 |
| 2.47 | .30 |
| 2.41 | .15 |
| 2.31 | .30 |
| 2.25 | .30 |
| 2.12 | .10 |
| 2.09 | .05 |
| 2.01 | .02 |
| 1.93 | .05 |
| 1.87 | .05 |

| Spacing d | Relative intensities $I/I_1$ |
|---|---|
| 1.85 | .05 |
| 1.82 | .10 |
| 1.72 | .05 |
| 1.66 | .02 |
| 1.62 | .02 |

The crystals are large in form and are extremely dense. The size and density characteristics afford a considerably greater ease in pharmaceutical formulating operations.

In addition to having characteristics which make possible its use directly in formulating operations, the crystalline monohydrate can be vacuum dried at elevated temperatures, as for example at 60° C. or above to yield an anhydrous powder with the same crystalline form and advantageous properties possessed by the monohydrate. The new form of crystalline anhydrous cephalexin is also suitable for the formulation of pharmaceutical compositions containing cephalexin.

The process of this invention provides a method for obtaining the crystalline cephalexin monohydrate hereinbefore described from cephalexin or from any of the acid addition salts thereof, as for example the hydrochloride, sulfate, nitrate, phosphate, or hydrobromide salt.

In accordance with the present invention, crystalline cephalexin monohydrate is prepared by precipitation from an aqueous solution, maintained at above about 58° C. of an acid addition salt of cephalexin. The nature of the acid salt is not a critical feature of the invention, the only requirement being that the salt have an appreciable solubility in the aqueous solution at the required temperature. The precipitation of the cephalexin monohydrate is accomplished by the addition to the aqueous solution of a base until the pH of the solution is in the range of about pH 3.5 to about pH 7, within which pH range cephalexin exists in its zwitterion form. The nature of the base employed is, similarly, not critical. In order to simplify the purification of the cephalexin monohydrate, however, it is preferred that the base employed is one which forms a water soluble salt with the acid employed in the formation of the cephalexin salt.

As illustrative of the methods by which this invention can be performed, cephalexin, as prepared, for example, by any of the hereinbefore disclosed methods, is purified by (1) suspending the antibiotic or a salt thereof in an aqueous medium, (2) adding a strong acid in sufficient quantity to dissolve the suspended antibiotic (3) raising the temperature of the solution to above about 58° C., (4) precipitating the antibiotic therefrom by the addition of a base, and (5) removing the crystalline antibiotic by filtration, decantation or the like. Alternatively, steps (1) and (2) of the process can be carried out at a temperature at or above 58° C. eliminating the need for heating the acidic solution of the antibiotic and thereby minimizing the time during which the antibiotic is in contact with hot acid. As a further alternative, a solid, water soluble acid addition salt of cephalexin can be dissolved in an aqueous solution, the solution brought to the required temperature, and precipitation effected by the addition of base.

The saturated supernatant solution containing crystalline cephalexin monohydrate can be cooled to below 58° C., as for example to ambient room temperature, without transforming the already formed monohydrate crystalline form to the undesirable dihydrate crystalline form which crystallizes from saturated aqueous solutions at temperatures below 58° C.

The aqueous medium employed in the process can be water alone, or it can contain certain non-interfering water-miscible organic materials to aid in the dissolution of the antibiotic. Such non-interfering water miscible organic materials can include, illustratively, lower-alkanols, as for example methanol, ethanol, propanol, and the like; di-lower-alkyl ketones as for example acetone, methyl ethyl ketone or the like; and lower-alkanoic acids, as for example acetic acid, propionic acid or the like.

Examples of strong acids to dissolve cephalexin in water prior to performing the process of this invention include mineral acids, as for example hydrochloric, nitric, phosphoric, hydrobromic, and sulfuric acids, or strong organic acids, as for example benzenesulfonic acid, toluenesulfonic acid, p-chlorobenzenesulfonic acid, benzoic acid, methanesulfonic acid, ethanesulfonic acid, cyclohexanesulfonic acid, toluic acid, o-chlorobenzoic acid, or the like.

Precipitation is accomplished by the addition of any basic substance which is soluble in water and which forms a water soluble salt with the anion of the cephalosporin salt. Such bases can include sodium hydroxide, potassium hydroxide, magnesium hydroxide, lithium hydroxide, ammonium hydroxide, methylammonium hydroxide, dimethylammonium hydroxide, trimethylammonium hydroxide, ethylammonium hydroxide, diethylammonium hydroxide, methylethylammonium hydroxide, dimethylethylammonium hydroxide, diethylmethylammonium hydroxide, isopropylamine, dimethylisopropylamine, β-hydroxyethylamine, ethylene diamine and the like.

The temperature of the precipitation step must be at or above about 58° C. Aqueous acidic solutions of cephalexin precipitated by the addition of base at below this temperature yield a dihydrate which is efflorescent and unstable. Temperatures greatly in excess of 58° C. cause a more rapid decomposition of the antibiotic and are to be avoided. The optimum precipitation temperature is about 60° C. to about 75° C.

The following examples will further illustrate the method of this invention.

EXAMPLE I

Cephalexin, 15 g., is suspended in 100 ml. of water at room temperature. Concentrated hydrochloric acid is added dropwise in an amount just sufficient to dissolve the antibiotic (90–100 drops). The acidity of the resulting solution is pH 1.8–1.9. The solution is heated to about 60° C. by immersion in a steam bath, and concentrated ammonium hydroxide is then added fairly rapidly with stirring to pH 4.3. After the addition of ammonium hydroxide is complete, the crystalline antibiotic which has been precipitated is isolated by filtratiton and the product is washed with a small amount of water to remove any coprecipitated ammonium chloride.

EXAMPLE II

The procedure of Example I is followed except that the antibiotic is first suspended in water at a temperature of 65° C. before the acid is added to effect dissolution.

EXAMPLE III

The procedure of Example II is followed except that glacial acetic acid is added to dissolve the suspended cephalexin.

I claim:
1. A method for the preparation of cephalexin monohydrate, 7-(D-α-aminophenylacetamido) - 3-methyl-3-cephem-4-carboxylic acid, which comprises treating an aqueous solution of a cephalexin acid addition salt at a temperature of at least about 58° C. and below a temperature which causes rapid decomposition of cephalexin with sufficient base to convert the cephalexin salt to cephalexin in its zwitterion form thereby precipitating crystalline cephalexin monohydrate and separating the cephalexin monohydrate so produced from the aqueous medium.

2. The method of claim 1 wherein the base is ammonium hydroxide.

3. The method of claim 1 wherein the cephalexin acid addition salt is the acetate.

4. The method of claim 1 wherein the cephalexin acid addition salt is the hydrochloride.

5. A method for the crystallization of cephalexin monohydrate which comprises:
(a) suspending cephalexin or an acid salt thereof in an aqueous solution containing sufficient quantity of a strong acid to dissolve the antibiotic at above 58° C.;
(b) adding a water-soluble base to precipitate the cephalexin as its monohydrate;
(c) separating the crystalline cephalexin monohydrate.

6. The method of claim 5 wherein the base is ammonium hydroxide.

7. The method of claim 5 wherein the cephalexin is suspended in aqueous acetic acid.

8. The method of claim 5 wherein cephalexin is suspended in concentrated aqueous hydrochloric acid.

References Cited

UNITED STATES PATENTS 3,382,241  5/1968  Flynn.

NICHOLAS S. RIZZO, Primary Examiner